United States Patent [19]
Hurst

[11] 3,789,387
[45] Jan. 29, 1974

[54] DYNAMIC MOTION DISPLAY SYSTEM

[76] Inventor: John B. Hurst, 6445 Brompton St., West University Pl., Dickinson, Tex. 77539

[22] Filed: Aug. 16, 1972

[21] Appl. No.: 281,209

Related U.S. Application Data

[63] Continuation of Ser. No. 78,881, Oct. 7, 1970, abandoned.

[52] U.S. Cl. ............................... 340/325, 340/380
[51] Int. Cl. ....................... G01f 15/06, G09f 9/36
[58] Field of Search. 40/130 K; 340/324 R, 380, 271, 340/325, 378, 379, 203, 206, 225; 324/70, 78 Z, 166

[56] References Cited
UNITED STATES PATENTS

| | | | |
|---|---|---|---|
| 3,568,177 | 3/1971 | Hasler | 340/324 R |
| 3,282,099 | 11/1966 | Kingman | 340/271 |
| 2,623,313 | 12/1952 | Fuchs | 340/324 R |
| 3,028,550 | 4/1962 | Naydan et al. | 324/70 |
| 3,184,872 | 5/1965 | Way | 340/380 |

*Primary Examiner*—John W. Caldwell
*Assistant Examiner*—Marshall M. Curtis

[57] ABSTRACT

A display system is disclosed for illustrating rotation of pumps, motors or the like, or flow of fluids through pipes in two directions. An electrical signal is derived from the motion device in the form of pulses which are proportional to speed, flow or any other measured parameter. The derived pulse is converted to sequentially coded signals which, in turn, are used to sequentially illuminate a display means. The display means may take the form of superimposed luminescent panels respectively having luminescent indicia sequentially displayed thereon so that sequential illumination of the panels will create the illusion of motion. Alternatively, the display means can be composed of a display member in which sequential luminescent indicia are respectively illuminated by sequential operation of fiber optic bundles. In another alternative form, electrically illuminescent paint or crystals may be disposed on a panel in an indicia for sequential illumination to create the illusion of motion.

13 Claims, 9 Drawing Figures

PATENTED JAN 29 1974 3,789,387
SHEET 1 OF 3
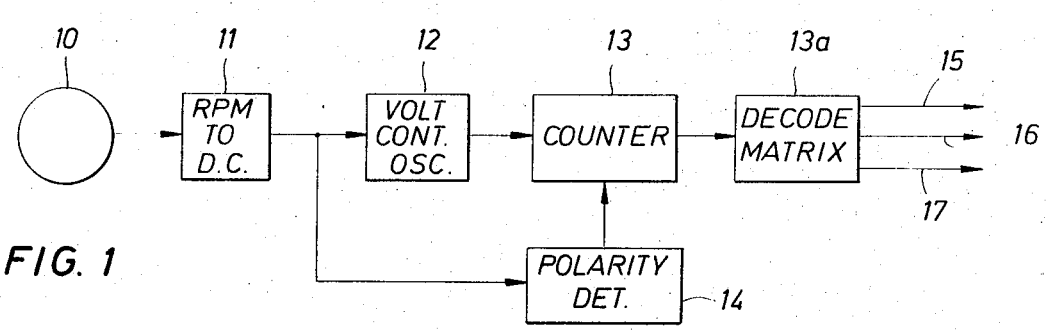
FIG. 1
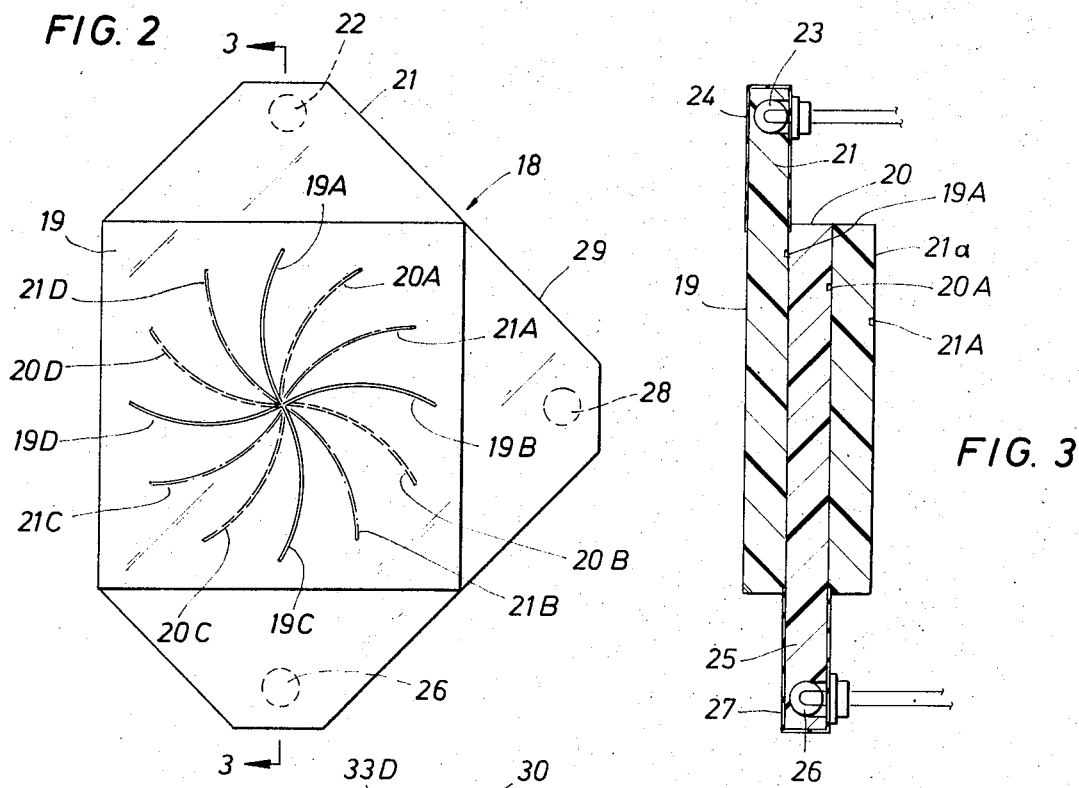
FIG. 2
FIG. 3
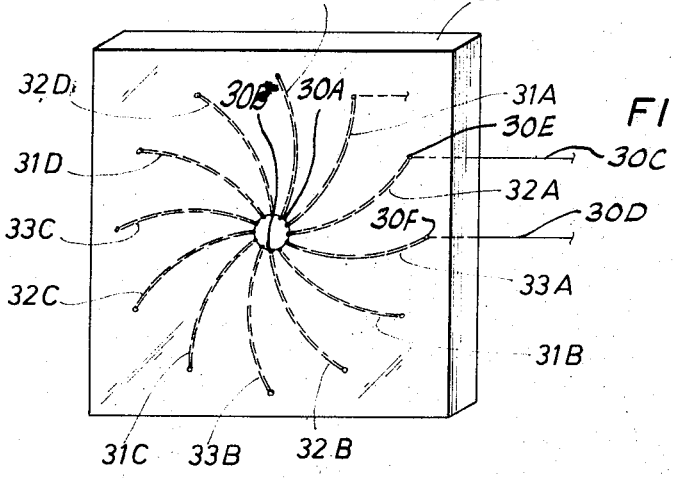
FIG. 4
John B. Hurst
INVENTOR
BY FIDLER & BARD
ATTORNEYS

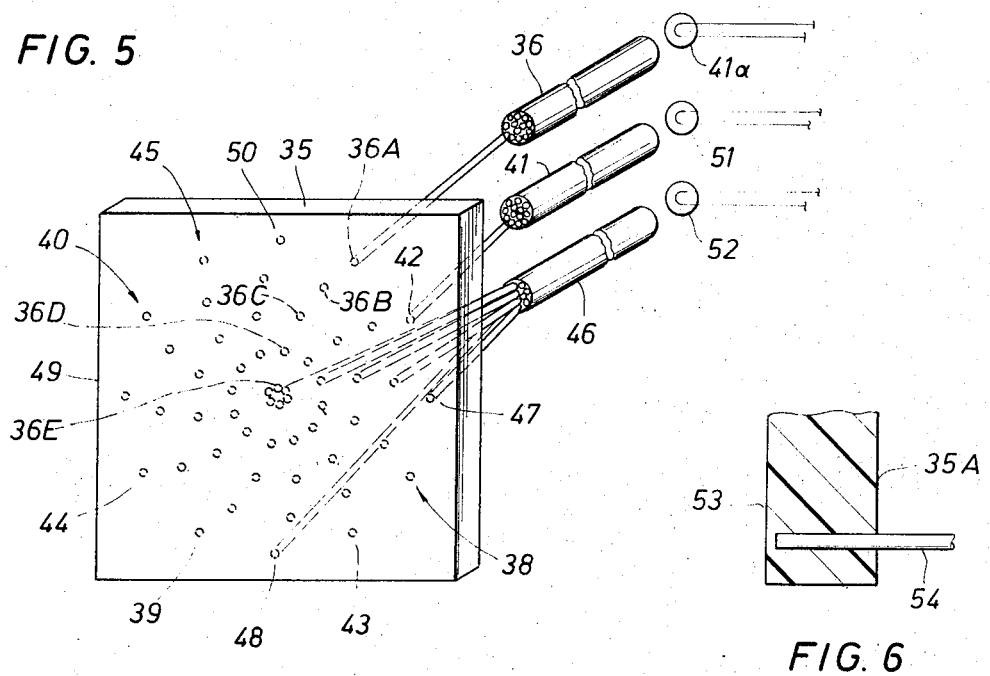
FIG. 5
FIG. 6
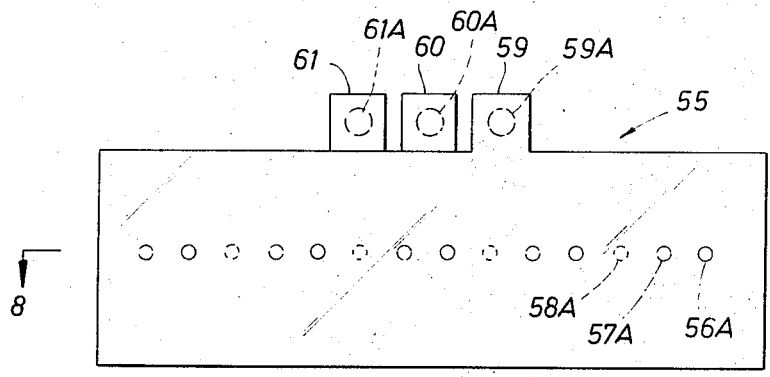
FIG. 7
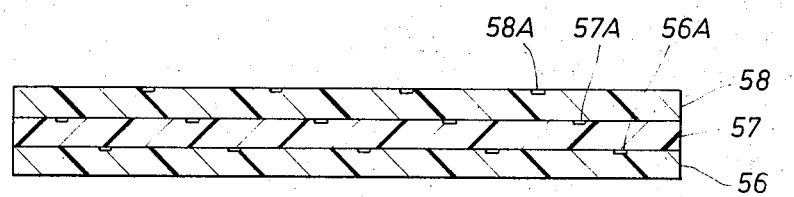
FIG. 8
John B. Hurst
INVENTOR
BY FIDLER & BARD
ATTORNEYS

DYNAMIC MOTION DISPLAY SYSTEM

This is a continuation of Ser. No. 78,881 filed Oct. 7, 1970 now abandoned.

The present invention relates to display systems and components and, more particularly, to visual motion display systems for maintaining operations of a plurality of parameters.

The purpose of the present invention is to provide a visual display which is illustrative of motion of the operation of components in a process control plant. By means of a visual display, at a single glance the control operator can determine with rough approximation the relative functioning of equipment. That is, if a centrifugal pump is pumping at its desired rate, the display device will indicate rotation of blades at the desired speed and direction. By observing correct displayed blade speeds over a period of time, the operator can more quickly determine an improper speed by a glance at the display than he can be reading or observing meters. In other words, the total visual perception of an operator can be used for a "quick look" determination of the plant operation without being dependent upon individual review of gauges or meters.

In the present invention, the display device includes clear Plexiglas plates which can be edge-lighted and, when superimposed over one another and sequentially illuminated, blade motion, for example, of a pump can be illustrated. The speed of the blade motion is, of course, a function of the pump input. To obtain the sequential illumination, a sensor is connected to a pump, for example, and obtains a DC voltage signal proportional to the rpm or speed of the pump. The DC signal, in turn, operates a voltage controlled oscillator to produce pulses whose rate is proportional to the DC input. The pusles are supplied to a counter which continuously generates separate signals for each pulse, and the separate signals are supplied to individual lamps of the display device. The sequence of these signals is controlled by the counter counting up for a positive polarity signal or down for a negative polarity signal.

In another aspect of the present invention, a single plate member is used, and the indicia, i.e., pump blades, are formed by holes appropriately arranged in the plate. Individual members of a fiber optic bundle are respectively coupled to the holes. By using separate fiber bundles for different blade positions, the illusion of motion can be created by sequential illumination of the various blade positions. In another aspect of the present invention, electrically illuminescent paint or crystals are applied to a plate member so that sequentially applied electrical signals will cause sequential illumination and the creation of the illusion of motion. The indicia may take the form of curved blades or straight line flow or any other suitable representation desired.

These and other objects, features and advantages of the invention will appear from the description given below, taken in connection with the accompanying drawings, illustrating by way of example the present invention.

In the drawings:

FIG. 1 is a schematic representation of the electronic system to provide decoded electric signals in sequence;

FIG. 2 is a plan view of a display means using superimposed plates;

FIG. 3 is a view taken along line 3—3 of FIG. 2;

FIG. 4 is a plan view of a display means using illuminescent paint crystals;

FIG. 5 is a plan view and perspective for a display means using fiber optics;

FIG. 6 is a view in cross-section of an alternative arrangement for the structure shown in FIG. 5;

FIG. 7 is a plan view of a display means using superimposed panels for displaying fluid flow;

FIG. 8 is a view taken along line 8—8 of FIG. 7; and

Figure 9:
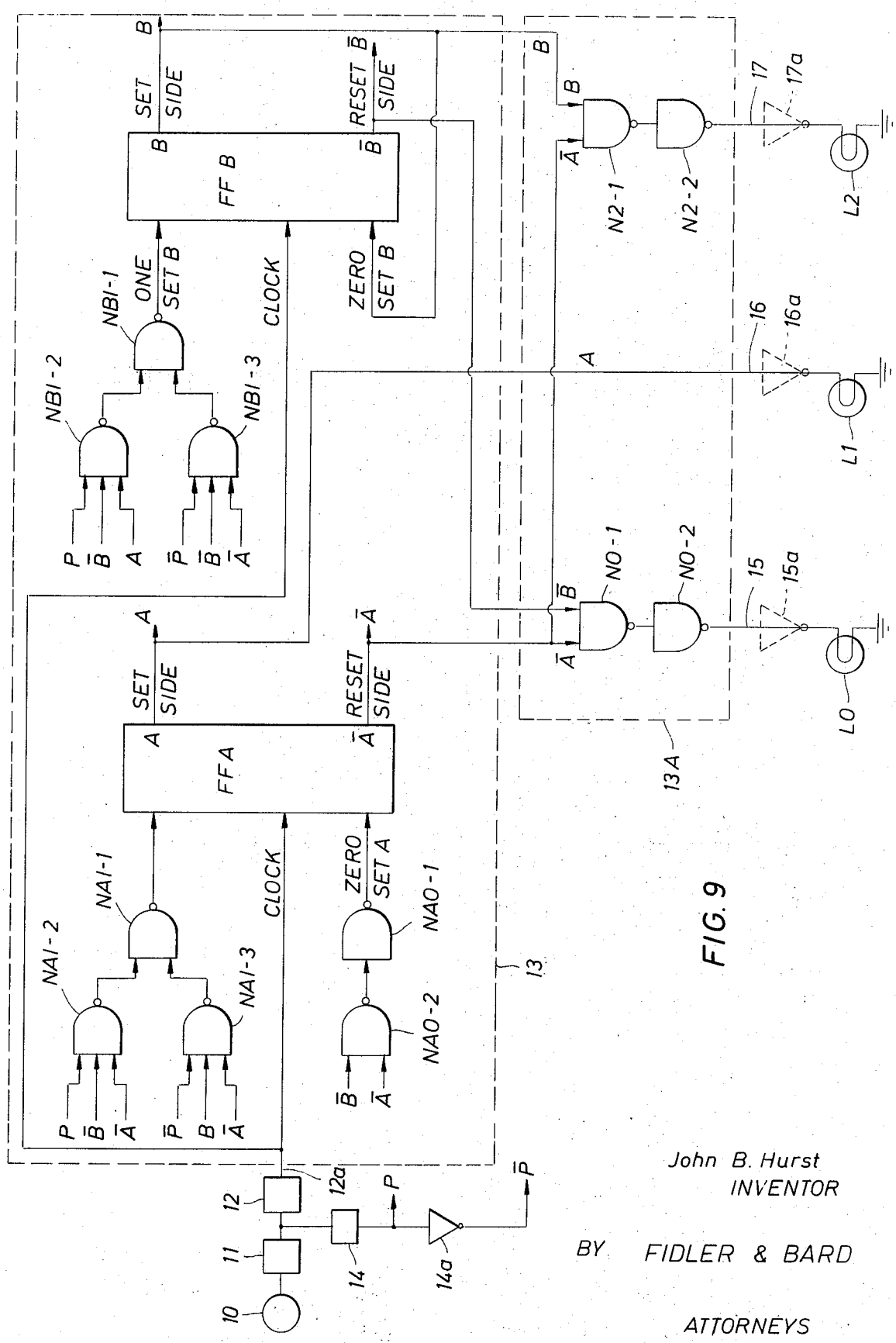
FIG. 9 is a schematic representation of the electronic system in more detail.

Referring now to FIG. 1, a motion device such as a pump 10 for pumping fluids is illustrated. A sensor 11 coupled to the pump detects the blade rotation or flow and provides a DC voltage which is proportional to the rpm, and whose polarity is controlled by direction of rotation. The output of the sensor 11 is supplied to a conventional voltage control oscillator 12 which produces pulses whose rate is proportional to the magnitude of the DC input. The pulse input from the oscillator 12 is supplied to the two stage synchronous counter 13. A polarity detector 14 controls the direction of the counter. The outputs from the counter 13 provide uniquely coded signals in a sequential manner. By means of a decoding matrix 13a, at least three repetitive and sequential output voltages are produced as depicted by numbers 15–17. The output voltages have a sequence which is controlled by the polarity of the input signal and are used to control a display means.

The electronic circuitry may best be understood from a consideration of FIG. 9. In FIG. 9, the counter 13 includes a flip-flop A and B, and a number of NAND steering gates NA1-1, NA1-2, NA1-3, NB1-1, NB1-2, NB1-3, NA0-1 and NA0-2. Flip-flop A has two outputs A, the set side, and $\bar{A}$, the reset side, while flip-flop B has outputs B and $\bar{B}$. In binary terms, if output A is 1 or "true" then the output $\bar{A}$ is 0 or "false." Similarly, output B is 1 or "true" and output $\bar{B}$ is 0 or "false." The outputs 15–17 are coupled to lights L0, L1, L2 respectively. The objective of the system is to provide an output from the flip-flops in a sequence, lighting up bulbs L0, L1, L2, repetitively for one direction of motion represented by a given polarity P which is designated as a 1 or "true" state and to provide an output from the flip-flops in a sequence lighting up bulbs L0, L2, L1 repetitively for an opposite direction of motion represented by a polarity $\bar{P}$ which is designated as a 0 or "false" state.

As shown in FIG. 9, the polarity signal P and $\bar{P}$ is derived by a polarity detector which can be a diode-resistance combination responsive to a positive or negative polarity signal from transducer 11 to provide an output P. An output $\bar{P}$ is obtained by an inverter 14a.

A truth table for the logic of the system is as follows:

TABLE I

| Operation | P | B | A | Pulse Code | Output |
|---|---|---|---|---|---|
| One set A | 1 | 0 | 0 | 0 | 15 |
| One set B | 1 | 0 | 1 | 1 | 16 |
| Zero set A |   |   |   |   |   |
| Zero set B | 1 | 1 | 0 | 2 | 17 |
| Repeat | 1 | 0 | 0 | 0 | 15 |

From this table, which is for a polarity of 1, it can be seen that for 0 pulses, i.e., when the apparatus if initially turned on, outputs B and A are 0. Flip-flop A input is one set. For the first pulse, A will become true 1 and output B remains 0. The input B is one set and input A zero set; then for the second pulse, output B IS 1 and and output A is 0. The input B is zero set; then outputs A and B are 0 for the third pulse, and the sequence can be repeated.

In the event that initially both outputs A and B are at 1, then output B is zero set which places the system in the condition shown for pulse code 2.

For the conditions where the polarity is 0, the following table applies:

TABLE II

| Operation | P | B | A | Pulse Code | Output |
|---|---|---|---|---|---|
| One set B | 0 | 0 | 0 | 0 | 15 |
| Zero set B | 0 | 1 | 0 | 2 | 17 |
| One set A |   |   |   |   |   |
| Zero set A | 0 | 0 | 1 | 1 | 16 |
| Repeat | 0 | 0 | 0 | 0 | 15 |

From this table, it can be seen that for 0 pulses, i.e., when the apparatus is initially turned on, outputs A AND B are 0. The input B is one set. For the first pulse, output B is 1, L and output A is 0. The input B is zero set and input A one set, then for the second pulse, output B is 0 and output A is 1. The input A is zero set, then outputs A and B are 0 for the third pulse and the sequence can be repeated.

In the event that initially both outputs A and B are at 1, then output B is zero set, which places the system in the condition shown for pulse code 1.

From table I it will readily be appreciated that a pulse code 0, 1, 2 is produced in sequence for outputs 15–17 and from table II that a pulse code 0, 2, 1 is produced in sequence for outputs 15, 17, 16. Thus three outputs are sequentially produced and are directed by polarity.

Logic equations may be written for the truth tables as follows (the + sign indicating an "or" condition):

$$\text{One set } A = P\bar{B}\bar{A} + \bar{P}B\bar{A} \quad (1)$$

$$\text{Zero set } A = PB\bar{A} + \bar{P}\bar{B}\bar{A} \quad (2)$$

$$\text{One set } B = P\bar{B}\bar{A} + \bar{P}\bar{B}A \quad (3)$$

$$\text{Zero set } B = PB\bar{A} + PBA + \bar{P}B\bar{A} + \bar{P}BA \quad (4)$$

These equations may be simplified in a well known manner to the following:

$$\text{One set } A = P\bar{B}\bar{A} + \bar{P}B\bar{A} \quad (5)$$

$$\text{Zero set } A = \bar{B}A \quad (6)$$

$$\text{One set } B = P\bar{B}\bar{A} + \bar{P}\bar{B}\bar{A} \quad (7)$$

$$\text{Zero set } B = B \quad (8)$$

Referring now to FIG. 9, flip-flop A has a clock input, a one set A input and a zero set A input and an A set side output and an $\bar{A}$ reset side output. Flip-flop B has a clock input, a one set B input and a zero set input and a B set side output and a $\bar{B}$ reset side output. The pulse output from oscillator 12 is supplied via a conductor 12a to the clock inputs of flip-flops A and B. The NAND steering gates NA1–2, NA1–3, NB1–2, NB1–3 and NA0–2 are receive inputs, as noted from the P and $\bar{P}$ outputs, the A and $\bar{A}$ outputs and the B and $\bar{B}$ outputs. The operation is such that a one set gating pulse into the flip-flop conditions the flip-flop to set on the next clock pulse, meaning that the set side goes to true and the reset side goes false. A zero set gating into a flip-flop conditions the flip-flop to reset, meaning that the set side goes false and the reset side goes true. The equations as noted above are implemented by the system to cause the counter to count forward for each clock pulse, the pulse code 0, 1, 2, 0, 1, 2, etc., for a true polarity P or, if the polarity is 0 or false, to count 0, 2, 1, 0, 2, 1, etc., for the pulse code.

From the truth tables the equations for decoding the states are as follows:

$$\text{Pulse code } 0 = \bar{A}\bar{B} \quad (9)$$

$$\text{Pulse code } 1 = A \quad (10)$$

$$\text{Pulse code } 2 = B\bar{A} \quad (11)$$

Thus, as shown in FIG. 9, NANDs N0–1 and N0–2 operate from inputs $\bar{A}$ and $\bar{B}$ to actuate light L0. Light L1 is actuated by the output from set side A. NANDs N2–1 and N2–2 operate from inputs $\bar{A}$ and B to actuate light L2.

The foregoing system is contemplated for use where three outputs are required. It will be readily apparent that similar principles can be employed to obtain more than three outputs. Also, if desired, inverters 15a–17a (shown in dashed line) can be employed, and this will give the effect of turning one light off in sequence with the other two lights being illuminated.

Referring now to FIGS. 2 and 3, display means 18 is comprised of superimposed sets of Plexiglas plates or panels 19, 20 and 21. The Plexiglas is preferably clear and, by virtue of the present invention, can have a minimum thickness of only one thirty-second inch. The reduced or small wall thickness is made possible because of the unique arrangement of the light sources which permits multiple stacking of plates without creating undue depth distortion effects. Plate 19 has curved grooves 19A–19D which represent pump blades. The grooves are cut into the rearward wall 22 of the plate and are located in a central body portion, as distinguished from an upwardly extending trapezoidal shaped tab 21. The tab 21 is provided with a perpendicular aperture or opening 2 which receives a bulb 23, and the tab and bulb are enclosed by an opaque layer of material 24 which extends toward and into the body portion of plate 19 a sufficient distance to prevent illumination of the adjacent plate 20. The bulb can be, for example, a Dialco bulb No. 507–3905, which is a 6-volt, 40 milliampere bulb, or a Sylvania bulb, 6ESB, can be used which is a 6-volt bulb operating at 100 milliamps. The middle plate 20 illustrated in FIG. 3 similarly has tab portion 25 which extends downwardly and has curved grooves 20A–20D representative of another blade position relative to the blade position of plate 19. Plate 20 similarly contains a bulb 26 and an opaque masking 27. The rearward plate 21 has curved grooves 21A–21D, which represent still another blade position relative to the blade position of plates 19 and 20. The rearward plate member 21 similarly has a bulb 28 disposed in a tab portion 29 and is masked.

Form the foregoing description, it will be appreciated that if the bulbs 23, 26 and 28 are sequentially illuminated, an illusion of blade rotation will be presented by the display device. The speed of blade rotation on the display means is functionally related to the speed of the pump of other motivating device. Therefore, the operator can become accustomed to observing the animated rotational speed and direction of the blades and form a mental perception of what the display should normally depict. Thus, if the mental impression is that the rotation is too fast, too slow, the wrong direction, or stopped, attention is called immediately to check the system. This impression is far more reliable and more quickly obtained than if reliance is placed on reading or gauges or meters.

By using the tab portions as noted heretofore, the plates can be thinner to prevent unnecessary depth illusion, and therefore a large number of plates can be used. Because the bulbs are perpendicularly inserted into the openings in the plates, larger bulbs can be used without interfering with the physical arrangement of the display. Larger bulb sizes, of course, can be used to produce greater light intensity and can minimize expense by not requiring special types of filaments in the bulbs to obtain sufficient edge lighting.

Referring now to FIG. 4, the display device can take the form of a single plate which can be opaque, if desired. In this form of the invention, the plate 30 has electrically conductive illuminating paint or crystals coated thereon in the desired form of indicia. In the form shown in FIG. 4, curved blades of a turbine are represented. Blades 31A-31D represent one set of blades; curved lines 32A-32D represent a second set of blades, and curved lines 33A-33D represent a third set of blades. Each of these blades has its innermost end coupled to a common conductor terminal 30A, such as copper, and an electric conductor 30B may be passed through an opening in the plate member 30 to a suitable electric ground. The outlying edges of line 31A-31D are commonly connected to a first output of the electrical system. Lines 32A-32D are commonly connected to a second output of the electrical circuit of FIG. 1, and lines 33A-33D are commonly connected to a third output of the electrical circuitry of FIG. 1. As shown in the drawing, the outlying terminal ends of lines 31-33 may be copper contact points similar to those of printed board technology, and conductors, such as illustrated by the lines 30C and 30D may be passed through small openings, such as illustrated by the numbers 30E and 30F and coupled to a copper.

Referring to FIG. 6 of the drawings, another display means is illustrated. The display means 35 consists of a plate which may be opaque and has a multiplicity of holes drilled therein to provide an indicia representation in terms of dots of light. The dots of light for each representation are obtained from individual members of a fiber optic bundle. For example, fiber optic bundle 36 has its individual members inserted into the openings 36A-36E which form one blade, and other members are inserted into similarly arranged openings generally indicated at 38, 39 and 40. Thus, when a lamp 41a is illuminated, blades 36(A-E), 38, 39 and 40 will be illuminated in points on the face of the plate. A fiber optic bundle 41 in a similar manner illuminates points shown generally at 42, 43, 44 and 45 in a second blade arrangement, while a fiber optic bundle 46 would illuminate blades 47, 48, 49 and 50. Lights 51 for bundle 41 and 52 for bundle 56 are tied to the electrical circuitry, as is light 41, to give the sequential illumination. Suitable masking is, of course, provided for light isolation between the bundles and bulbs. The use of fiber optic bundles has a great advantage in reducing or miniaturizing the displays where such miniaturization is desirable or necessary. As shown in FIG. 6, the holes in the plate 35A may be terminated short of a forward surface 53, thereby forming a blind hole so that a fiber optic strand 54 does not extend entirely through the panel. This is, of course, only possible with transparent panels.

Referring now to FIG. 7, a display means 55 is illustrated for representing flow of a liquid. In this embodiment, the plates 56, 57 and 58 are superimposed and respectively have longitudinally displayed recesses 56A, 57A and 58A arranged in a representative manner along the length of the panel members. Edge lighting is provided by using tab 59 on panel 56, tab 60 on panel 57 and tab 61 on panel 58. These tabs are similar in function and design to the tabs shown in FIGS. 2 and 3, whereby bulbs 59A, 60A and 61A may be inserted into perpendicular openings. As noted before, an opaque covering is provided for the tabs to channel the lighting directly to the individual panels. By coupling each of the light bulbs to the electrical system heretofore described, the dots in the panel will sequentially light in sequential groupings, thereby giving the illusion of flow, and the speed of flow is of course a function of the speed at which the bulbs are actuated. The direction of flow is again controlled by the sequence of activation as defined by the polarity signal. Another version for flow uses the inverted signals which make an off light appear to move, always leaving the other two on.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Apparatus for translating repetitive motion to a display comprising:
   means for sensing continuous and repetitive motion in a given direction and for providing electrical signals in serial pulse form and functionally related to said motion,
   means for converting said electrical signals to a plurality of sequential signal trains having a cyclic repetition rate functionally related to said motion, said converting means including a counter means and decoding means,
   display means having a plurality of indicia thereon, each such indicia being displaced from other such indicia to form a repetitive pattern,
   light means for each of said indicia, means responsive to said sequential signals from said decoding means for sequentially actuating said light means and said indicia for providing an illusion of repetitive motion.

2. The apparatus of claim 1 wherein said display means includes superimposed, light-transmitting plate members, said plate members respectively having said indicia thereon in sets wherein sets of indicia on each of said plate members form said repetitive pattern and are sequentially located relative to one another, said light means being arranged for each of said plate members for activating the sets of indicia on a plate member.

3. The apparatus of claim 2 wherein said superimposed plate members have main body portions which are superimposed and respectively have tab portions extending beyond said main body portions, and said light means extend into each of said tab portions.

4. The apparatus of claim 3 wherein the indicia of said sets of indicia on said superimposed plate members are curved in a manner schematically representative of pump blades and said sensing means is adapted for coupling to a pump.

5. The apparatus of claim 3 wherein the indicia of said sets of indicia on said superimposed plate members are straight line segments schematically representative of a flow pipe and said sensing means is adapted for coupling with a flow sensor.

6. The apparatus of claim 1 wherein said means for sensing motion also senses direction of motion and said converting means also provides signals representative of the direction of motion whereby motion in opposing directions can be displayed.

7. The apparatus of claim 1 wherein said display means includes a plate member, a plurality of electrically illuminescent conductors arranged to form sets of indicia with the sets of indicia having a repetitive pattern and sequentially located relative to one another, and means responsive to said converting means for sequentially activating said illuminescent conductors with respect to the sets of indicia for providing an illusion of continuous and repetitive motion.

8. The apparatus of claim 7 wherein said conductors have one end thereof coupled to a common ground and to a conductor passing through said plate member and opposite ends coupled to the outputs of said converting means.

9. Apparatus for translating dynamic motion to an electrically driven, visual display, and comprising:
means for converting repetitive dynamic motion in a given direction to electrical pulse signals,
means responsive to said pulse signals for producing electrical pulse outputs havng a coded relationship to each pulse signal in repetitive sequences of said input pulse signals, decoder means for providing a distinct output signal for each said electrical pulse ouput, and
display means having a plurality of indicia thereon, each such indicia being displaced from other such indicia to form a light means for each of said indicia, each said light means being responsive to each of said output signals respectively for providing an illusion of repetitive motion.

10. The apparatus of claim 9 wherein said means for producing said electrical pulse outputs produces said coded relationship for said electrical pulse outputs as a function of direction of such dynamic motion.

11. The apparatus of claim 10 wherein said means for producing pulse outputs having a coded relationship includes bidirectional synchronous counter means and said means for providing separate output signals includes decoding matrix means.

12. The apparatus of claim 1 wherein said display means includes a plate member and a plurality of fiber optic bundles, each of said bundles having individual members coupled to said plate member in an arrangement forming said plurality of indicia into sets of indicia with the sets of indicia being arranged in a repetitive pattern and sequentially located relative to one another, and means responsive to said converting means for sequentially activating said fiber optic bundles with respect to said sets of indicia for providing an illusion of continuous and repetitive motion.

13. The apparatus of claim 12 wherein said plate member is opaque and said individual members extend into openings in said plate member.

* * * * *